US005918250A

United States Patent [19]

Hammond

[11] Patent Number: 5,918,250

[45] Date of Patent: Jun. 29, 1999

[54] METHOD AND APPARATUS FOR PRELOADING DEFAULT ADDRESS TRANSLATION ATTRIBUTES

[75] Inventor: Gary N. Hammond, Campbell, Calif.

[73] Assignee: Intel Corporation, Santa Clara, Calif.

[21] Appl. No.: 08/436,800

[22] Filed: May 5, 1995

[51] Int. Cl.$^{6}$ .............................. G06F 12/10; G06F 12/00

[52] U.S. Cl. ............................ 711/205; 711/207; 395/389

[58] Field of Search .................................... 395/414, 415, 395/416, 417–418, 383, 500; 711/207, 204, 205, 206, 208, 389

[56] References Cited

U.S. PATENT DOCUMENTS

| | | | |
|---|---|---|---|
| 4,774,659 | 9/1988 | Smith et al. | 711/208 |
| 4,881,075 | 11/1989 | Weng | 341/87 |
| 5,060,137 | 10/1991 | Bryg et al. | 711/205 |
| 5,179,674 | 1/1993 | Williams et al. | 711/204 |
| 5,265,213 | 11/1993 | Weiser et al. | 395/587 |
| 5,278,963 | 1/1994 | Hattersley et al. | 711/204 |
| 5,377,336 | 12/1994 | Eickemeyer et al. | 395/383 |
| 5,418,975 | 5/1995 | Babaian et al. . | |
| 5,442,766 | 8/1995 | Chu et al. | 711/204 |
| 5,465,337 | 11/1995 | Kong | 711/207 |
| 5,493,660 | 2/1996 | DeLano et al. | 711/206 |
| 5,652,872 | 7/1997 | Richter et al. | 395/500 |

OTHER PUBLICATIONS

*Pentium™ Processor User's Manual, vol. 3: Architecture and Programming Manual*, Intel Corporation, 1993, pp. 11-1—11-25.

Kane, Gerry and Joe Heinrich, *MIPS RISC Architecture*, MIPS Computer Systems, Inc., 1992, pp. 218, 4-1—4-30, 6-1—6-57.

Tom Shanley and Don Anderson, *ISA System Architecture*, Mindshare Press (1993); Chapter 3, pp. 149–156, and pp. 57–69.

*Primary Examiner*—Eddie P. Chan
*Assistant Examiner*—Hong C. Kim
*Attorney, Agent, or Firm*—Blakely Sokoloff, Taylor & Zafman LLP

[57] ABSTRACT

A method and apparatus for installing translations in a translation look-aside buffer. According to the method, each translation contains either a first attribute or a second attribute. Either the first attribute or the second attribute is selected as a default attribute to be preloaded into a translation installation storage area. When it is determined that a translation for translating a virtual address into its corresponding translated address is not stored in the translation look-aside buffer, the attribute area of the translation installation storage area is loaded with the selected default attribute (This translation installation storage area also contains a virtual address area and a translated address area). Then, the translation for the virtual address is determined. The data stored in the translation installation storage area is altered as necessary, to represent the determined translation. The translation is then installed in the translation look-aside buffer using the data stored in the translation installation storage area.

20 Claims, 3 Drawing Sheets

100

TLB 155
MEMORY MANAGEMENT UNIT 150
EXECUTION UNIT 145
TLB INSTALLATION REGISTERS 160
VIRTUAL ADDRESS REGISTER 162
PHYSICAL ADDRESS REGISTER 164
TRANSLATION ATTRIBUTE REGISTER 170
172 174 176
184 186
TLB DEFAULT REGISTER 180
PRELOAD CIRCUIT 195
192
CURRENT PROCESS REGISTER 190
PROCESSOR 110
140
TLB HANDLER 197
STORAGE DEVICE 120
KEYBOARD 130
DISPLAY 135
NETWORK 125

METHOD AND APPARATUS FOR PRELOADING DEFAULT ADDRESS TRANSLATION ATTRIBUTES

BACKGROUND OF THE INVENTION

1. Field of the Invention

The invention relates to the field of computer systems. More specifically, the invention relates to the area of memory management.

2. Background Information

Memory addressing schemes often use a technique called paging to implement virtual memory. When using paging, the virtual address space (i.e., the address space generated by either the execution unit of a processor or by the execution unit in conjunction with a segmentation unit a processor) is divided into fix sized blocks called pages, each of which can be mapped onto any of the physical addresses (i.e., the addresses that correspond to hardware memory locations) available on the system. In a typical computer system, a memory management unit determines and maintains, according to a paging algorithm, the current mappings for the virtual to physical addresses using page tables. Upon receiving a virtual address from the execution unit of a processor, the memory management unit translates the virtual address into its corresponding physical address using the page tables.

In one implementation, the page tables are accessed using a page directory. Each virtual address includes three portions: a directory portion, a table portion, and an offset portion. The directory portion is an offset into the page directory, which is held in main memory. The base-address of this page directory is held in a control register. The processor adds the base-address to the directory portion to get the address of the appropriate directory entry. Each directory entry stores the base-address of a page table, which is also held in main memory. The processor finds the address of the appropriate page-table entry by adding the table portion (from the virtual address) to the page-table-base address (from the directory entry). Each page-table entry stores the base-address of a page-frame. Finally, the processor finds the virtual address' corresponding physical address by adding the offset portion (from the virtual address) to the page-frame-base address (from the page-table entry).

Since the page tables are in main memory, accessing them is time consuming. To speed up the paging translations, certain of the translations are stored in a translation look-aside buffer or TLB (a faster memory that is preferably located on the processor). Upon generating a virtual address requiring translation, the memory management unit first searches for the translation in the TLB before accessing the paging algorithm and page tables.

Each translation stored in the TLB typically contains a virtual address portion, a physical address portion, and an attribute portion. To determine if a translation corresponds to a virtual address, the directory and table portions of the virtual address are compared to the virtual address portion of the translation. If they do not match, the translation does not correspond to the virtual address. However, if they match, the translation corresponds to the virtual address. If the translation corresponds to the virtual address, the physical address portion of the translation is concatenated with the offset portion of the virtual address to generate the virtual address' corresponding physical address. Further explanation of paging schemes is provided in Shanley, Tom and Anderson, Don, *ISA System Architecture*, published by MindShare, Inc., 1993.

One method for implementing a memory management unit is to hardwire the paging translation algorithm in the processor. A second method for implementing a memory management unit is to allow the paging translation algorithm to be determined by the operating system (commonly referred to as software TLB fills). According to this second method, if during the execution of a process a virtual address is generated whose translation is not installed in the TLB, a TLB miss fault is generated. In response to the TLB miss fault, the processor interrupts the execution of the current process, stores the interrupted process' execution environment (i.e., the information necessary to resume execution of the interrupted process), and invokes an operating system handler (referred to herein as the TLB handler) to determine the paging translation. The TLB handler determines the translation and causes the processor to install it in the TLB. Typically, the installation of translations into the TLB is performed using TLB installation registers located on the processor—i.e., the TLB handler stores the translation in the TLB installation registers and instructs the processor to install the translation in the TLB. These registers often include a virtual address installation register, a physical address installation register, and an attribute installation register for storing the virtual address portion, physical address portion, and attribute portion, respectively, of the translation to be installed in the TLB. Upon completion of the TLB handler, the processor resumes execution of the interrupted process.

TLB fills occur at a much higher rate than other types of events (e.g., exceptions, interrupts, operating system calls, etc.). This high rate of occurrence makes it desirable that the software TLB fills handler(s) be as streamlined as possible.

SUMMARY

A method for installing translations in a translation look-aside buffer is provided. According to this method, each translation contains either a first attribute or a second attribute. Either the first attribute or the second attribute is selected as a default attribute to be preloaded into a translation installation storage area. When it is determined that a translation for translating a virtual address into its corresponding translated address is not stored in the translation look-aside buffer, the attribute area of the translation installation storage area is loaded with the selected default attribute (This translation installation storage area also contains a virtual address area and a translated address area). Then, the translation for the virtual address is determined. The data stored in the translation installation storage area is altered as necessary, to represent the determined translation. The translation is then installed in the translation look-aside buffer using the data stored in the translation installation storage area.

According to another aspect of the invention, an apparatus for installing a translation in a translation look-aside buffer is provided. The apparatus generally includes a processor having a translation look-aside buffer, a translation look-aside buffer installation storage area, and a preload circuit. The translation look-aside buffer installation storage area includes a virtual address area, a translated address area and an attribute area. The preload circuit has an input coupled to a signal indicating a translation for a virtual address is not stored in the translation look-aside buffer. In addition, the preload circuit is coupled to the attribute area of the translation look-aside buffer installation storage area. According to another aspect of the invention, a default attribute storage area is included. This default attribute storage area is coupled to the preload circuit and has stored therein a default attribute.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to unnecessarily obscure the invention.

Overview

This application describes a method and apparatus for streamlining software TLB fills. In one embodiment, the processor preloads, the most common translation attributes into the TLB installation registers each time a TLB fault is encountered. If the preloaded default translation attributes are correct, the software TLB handler is not required to load the attribute portion of the translation into the TLB installation registers and the performance of the TLB fill is increased. In one embodiment, the operating system selects the default static translation attributes by storing them in a default translation register.

One Embodiment of the Invention

Figure 1:
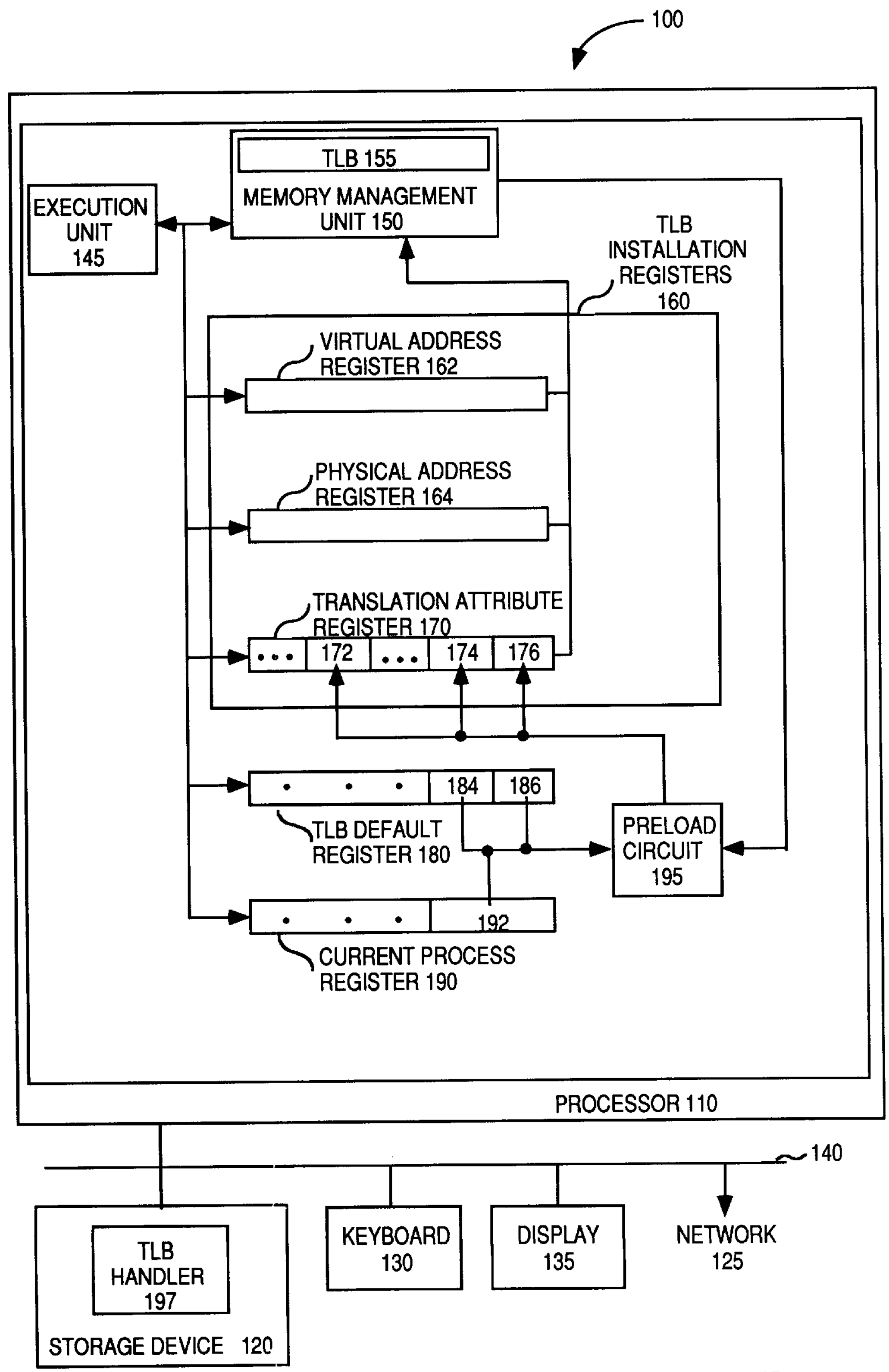
FIG. 1 illustrates a block diagram of an exemplary computer system 100 incorporating the teachings of the invention.

FIG. 1 is a block diagram illustrating an exemplary computer system 100 incorporating the teachings of the invention. The exemplary computer system includes a processor 110, a storage device 120, a network 125, and a bus 140. Processor 110 is coupled to storage device 120 and network 125 by bus 140. In addition, a number of user input/output devices, such as a keyboard 130 and a display 135, are also coupled to bus 140. Processor 110 represents a central processing unit of any type of architecture, including a CISC or RISC type architecture. Storage device 120 represents one or more mechanisms for storing data. For example, storage device 120 may include read only memory (ROM), random access memory (RAM), magnetic disk storage mediums, optical storage mediums, and/or flash memory devices. While one embodiment will be described in which the invention is implemented in a single processor computer system, the invention could be implemented in a multi-processor computer system.

FIG. 1 also illustrates that processor 110 includes an execution unit 145, a memory management unit 150, TLB installation registers 160, a TLB default register 180, a current process register 190, and a preload circuit 195. Of course, processor 110 contains additional circuitry which is not shown so as to not obscure the invention.

TLB default register 180 and Current process register 190 are used for storing the default translation attributes. TLB default register 180 includes a number of bits which make up a preferred page size indication 184. Preferred page size indication 184 identifies which of the multiple page sizes supported by processor 110 is selected as the default page size (also termed as the "preferred page size"). Processor 110 preferably supports at least a 4K page size, a 16K page size, and a 4M page size. TLB default register 180 also includes a number of bits which make up a caching protocol indication 186. Caching protocol indication 186 identifies which of the different caching protocols is selected as the default caching protocol. Current process register 190 includes a number of bits which make up an address space identifier (ASID) indication 192. Address spaces identifiers are used to implement multiple address spaces; each process is assigned a different address spaces identifier. ASID indication 192 identifies the ASID of the process currntly being executed by processor 110. An operating system executing on processor 110 stores preferred page size indication 184, caching protocol indication 186, and ASID indication 192 in TLB default register 180 and current process register 190. While one embodiment is described in relation to several different default attributes, alternative embodiments of the invention could use more, less, or other default attributes.

Memory management unit 150 includes a TLB 155 and supports the mapping of virtual memory addresses to physical memory addresses using a software TLB handler 197 stored in storage device 120. While one embodiment is described in which memory management unit 150 utilizes software translation fills, alternative embodiments could implement the memory management unit in any number of ways. For example, an alternative embodiment could implement the memory management unit to include a hardwired paging translation algorithm circuit.

TLB 155 is used for speeding up the translation of virtual memory addresses in the translated memory addresses. While these translated memory addresses are described herein as physical memory addresses, in alternative embodiments these translated memory addresses could be used for any number of purposes. For example, further translations could be performed on these translated memory addresses before physical addresses are achieved. In addition, while one embodiment is described in relation to translating a virtual memory address space, alternative embodiments could use the invention to assist in the translation of any type of addresses. TLB 155 can be implemented in any number of ways. For example, in one embodiment TLB 155 supports only one page size using a direct-mapped cache. In an alternative embodiment TLB 155 supports multiple page sizes using a fully associative cache, multiple direct-mapped caches, or a combination of a fully associative cache and one or more direct-mapped caches. In another alternative embodiment, TLB 155 includes a dynamically configurable cache as described in "Preferred Page Sizes," filed on Mar. 31, 1995, Ser. No. 08/414,206.

TLB installation registers 160 are used for storing translations in TLB 155. TLB installation registers 160 include a virtual address register 162, a physical address register 164, and a translation attribute register 170, for storing the virtual address portion, physical address portion, and attribute portion of the translation, respectively, to be installed in TLB 155.

In response to a process executing on processor 110 generating a virtual address whose translation is not stored in TLB 155, processor 110 generates a TLB miss fault. In response to this TLB miss fault, the processor stores the directory and page portions of the virtual address in virtual address register 162. Also in response to the TLB miss fault, preload circuit 195 preloads translation attribute register 170 by "plugging" in the default translation attributes stored in TLB default register 180 and current process register 190—i.e., preferred page size indication 184 is copied into translation attribute register 170 as page size attribute 174, caching protocol indication 186 is copied into translation attribute register 170 as caching protocol attribute 176, and ASID indication 192 is copied into translation attribute register 170 as ASID attribute 172. If these preloaded default translation attributes are correct for the translation, then the software TLB handler is required to load only one register (i.e., store the physical address portion of the translation in physical address register 164) to complete the translation. Thus, the performance of the software TLB fill is increased because the handler is not required to load the attribute portion of the translation. However, if the preloaded default translation attributes are incorrect, then the TLB handler must load both the correct attribute portion and the physical address portion of the translation into the appropriate TLB installation registers.

Also in response to the TLB miss fault, processor 110 interrupts the execution of the current process, stores the interrupted process' execution environment (i.e., the information necessary to resume execution of the interrupted process), and invokes TLB handler 197 to provide the paging translation.

TLB handler 197 determines the translation for the virtual address and stores the translation in TLB installation registers 160. As previously described, if the preloaded default translation attributes are correct for the translation, then TLB handler 197 is required to load only the physical address portion of the translation into physical address register 164. However, if the preloaded default translation attributes are incorrect, then TLB handler 197 must load both the correct attribute portion and the physical address portion of the translation into the appropriate TLB installation registers. Once the correct translation is stored, TLB handler 197 instructs processor 110 to install the translation in TLB 155. Upon completion of the TLB handler, processor 110 resumes execution of the interrupted process using the previously stored execution environment.

Figure 2:
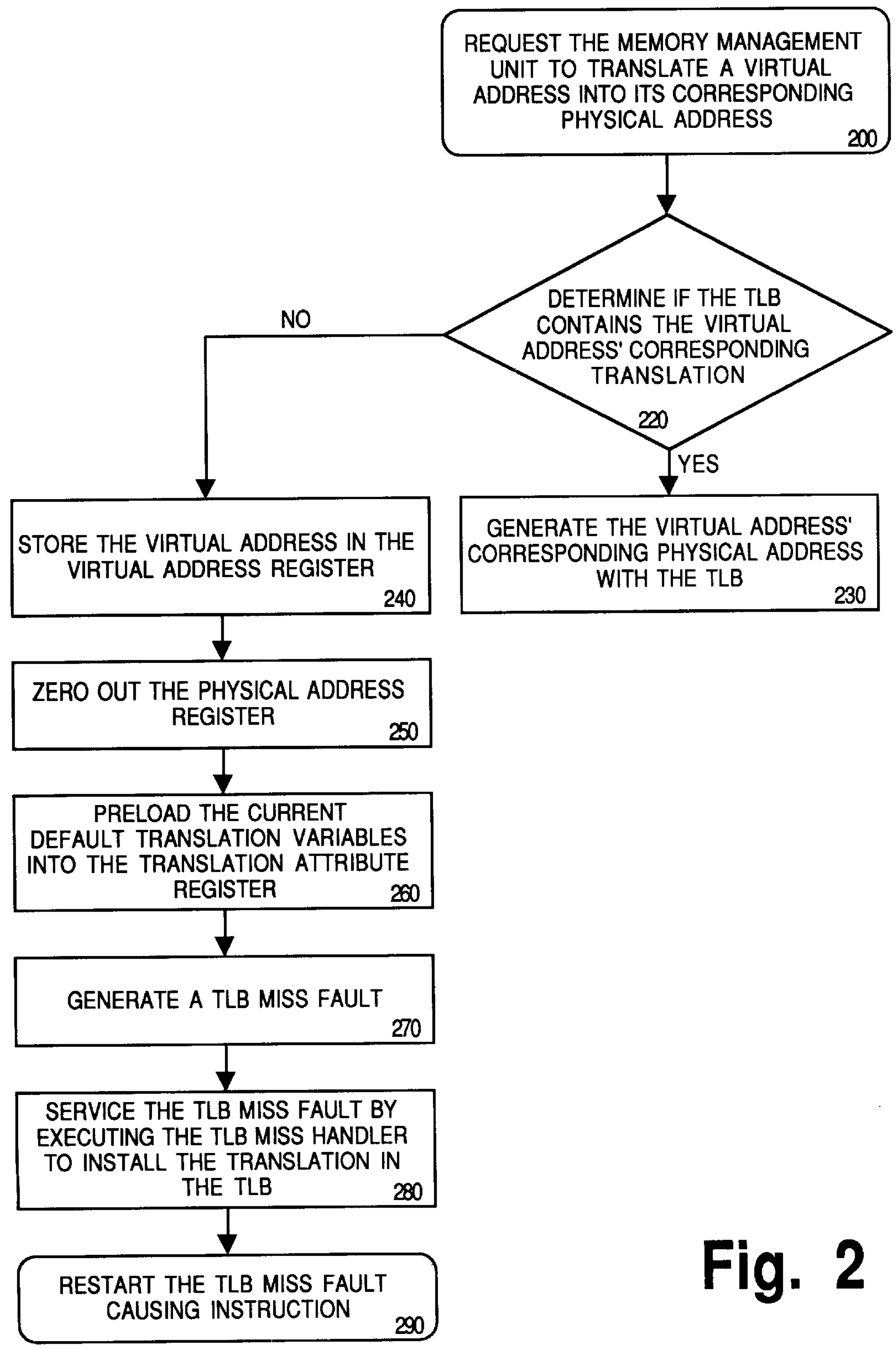
FIG. 2 illustrates a flow diagram of the steps performed by processor 110 upon a request to the memory management unit to translate a virtual address into its corresponding physical address according to one embodiment.

FIG. 2 shows a flow diagram of the steps performed by processor 110 upon a request to the memory management unit to translate a virtual address into its corresponding physical address according to one embodiment of the invention. Starting at step 200, a request is sent to the memory management unit to translate a virtual address into its corresponding physical address. From step 200, flow passes to step 220.

As shown in step 220, it is determined if the TLB contains the translation for the virtual address. If a match was found, flow passes to step 230. Otherwise, flow passes to step 240.

At step 230, the virtual address' corresponding physical address is determined using the matching translation and the flow diagram ends.

As shown in step 240, the virtual address (i.e., the virtual address whose translation is not stored in the TLB) is stored in the virtual address register of the TLB installation registers. From step 240, flow passes to step 250.

As shown in step 250, the physical address register of the TLB installation registers is zeroed out. From step 250, flow passes to step 260.

As shown in step 260, the current default translation attributes are preloaded into the translation attribute register of the TLB installation registers. From step 260, flow passes to step 270.

At step 270, a TLB miss fault is generated and flow passes to step 280. This TLB miss fault is generated and serviced by the event handling mechanism of processor 110. Event handling mechanisms are well known in the art.

As shown in step 280, the TLB miss fault is serviced by executing the TLB miss handler to install the translation for the virtual address in the TLB. This step will be further described with reference to FIG. 3. From step 280, flow passes to step 290.

As shown in step 290, the processor resumes execution of the interrupted process at the TLB miss fault causing instruction (i.e., the instruction that generated the virtual address described in step 200). In so doing, the same virtual address will again be generated and the memory management unit will again be requested to translate that virtual address. However, this time the translation will be stored in the TLB. As a result, flow will pass through the flow diagram and terminate in step 230 in which the corresponding physical address is determined for the virtual address.

Figure 3:
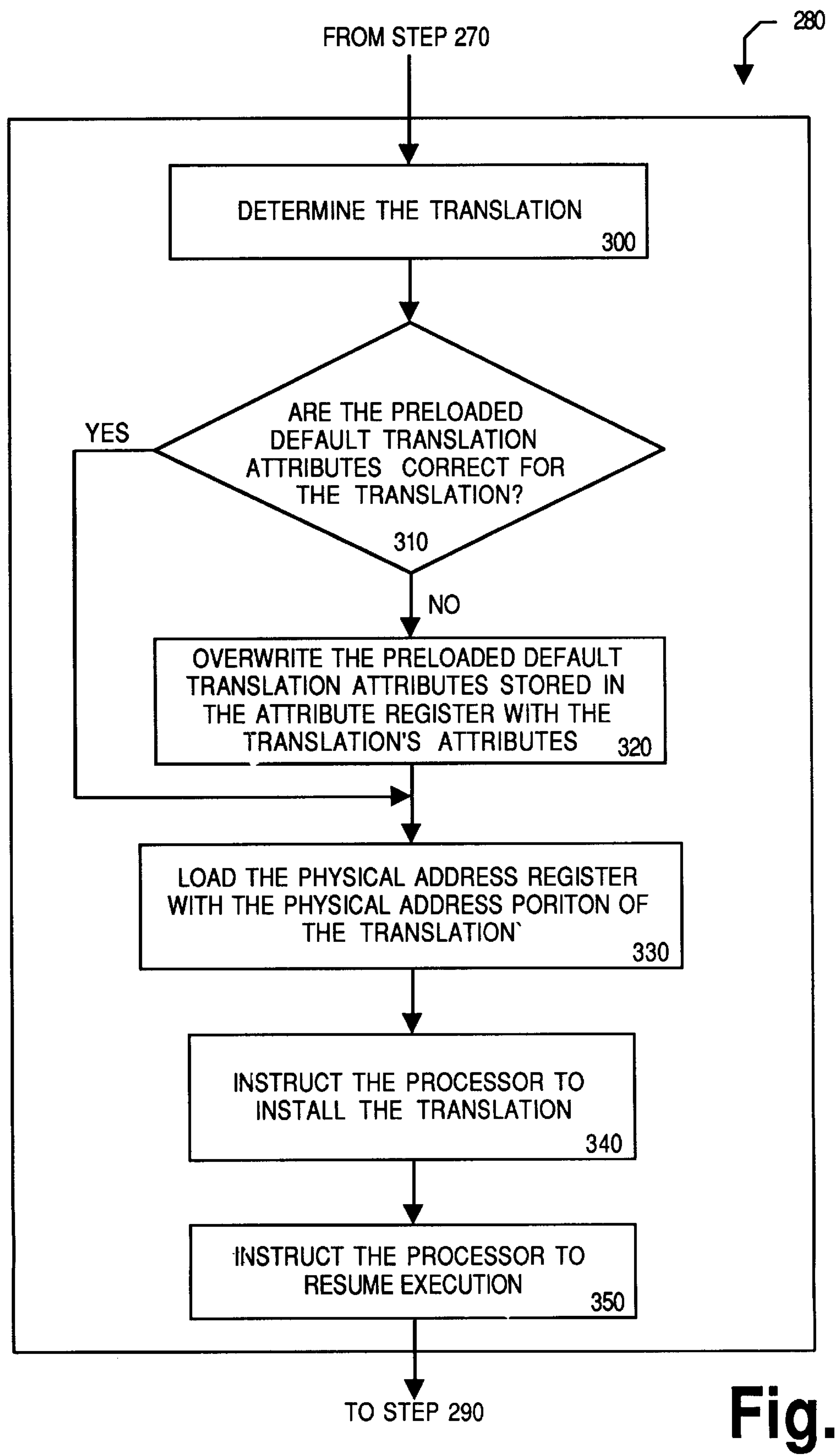
FIG. 3 illustrates a more detailed description of the steps performed in step 280 (i.e., the steps performed by the TLB handler).

FIG. 3 shows a more detailed description of the steps performed in step 280 (i.e., the steps performed by the TLB handler). From step 270, in which a TLB miss fault is generated, flow passes to step 300.

As shown in step 300, the translation for the virtual address is determined and flow passes to step 310. Methods for performing this determination are well known in the art, and thus, are not further described here so as not to obscure the invention.

At step 310, it is determined whether the preloaded default translation attributes are correct for the determined translation. If so, flow passes to step 330. Otherwise, flow passes to step 320. In this manner, if the preloaded default translation attributes, which should be the most frequently used attributes, are correct, the TLB fill is streamlined by removing the need to load the attribute portion of the translation.

As shown in step 320, the preloaded default translation attributes stored in the attribute register of the TLB installation registers are overwritten with the determined translation's attributes. From step 320, flow passes to step 330.

At step 330, the physical address portion of the determined translation is loaded into the physical address register of the TLB installation registers. From step 330, flow passes to step 340.

As shown in step 340, the TLB handler instructs the processor to install the translation and flow passes to step 350. In response to receiving this instruction, the processor installs the translation in the TLB.

As shown in step 350, the TLB handler instructs the processor to resume execution of the process interrupted for servicing the TLB miss fault. From step 350, flow passes to step 290.

Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A microprocessor comprising:

a translation look-aside buffer;

a translation look-aside buffer installation storage area including a virtual address area, a translated address area, and an attribute area;

a preload circuit having a first input coupled to receive a signal indicating a translation for a virtual address is not stored in said translation look-aside buffer, said preload circuit coupled to said attribute area to preload one of a default caching protocol and a default page size, wherein the preloaded one of said default caching protocol and said default page size is to be overwritten if incorrect prior to installing said translation into said translation look-aside buffer.

2. The microprocessor of claim 1 further comprising:

a translation look-aside default register coupled to said preload circuit.

3. A computer system comprising:

a first storage area having stored therein an instruction; and a processor coupled to said first storage area comprising, a translation look-aside buffer, a translation look-aside buffer installation storage area including a virtual address area, a translated address area, and an attribute area, a default attribute storage area to store a default attribute, said processor storing said default attribute in said default attribute storage area in response to executing said instruction, and a preload circuit having a first input coupled to receive a signal indicating a translation for a virtual address is not stored in said translation look-aside buffer, said preload circuit coupled to said default attribute storage area and said attribute area.

4. The computer system of claim 3, wherein data stored in said attribute area identifies at least one of a page size and a caching protocol.

5. The computer system of claim 3, said processor storing at least part of said virtual address in said virtual address area in response to said signal.

6. In a computer system, a method for installing a translation in a translation look-aside buffer for translating a virtual address into a corresponding translated address, said method comprising the steps of:

A) determining said translation for translating said virtual address into said corresponding translated address is not stored in said translation look-aside buffer;

B) altering an attribute portion of a data stored in a translation installation storage area to represent a default attribute, said data including a virtual address portion and a translated address portion in addition to said attribute portion;

C) determining said translation subsequent to said step of altering said attribute portion;

D) altering said attribute portion as necessary to cause said data to represent said translation; and E) installing in said translation look-aside buffer said translation using said data stored in said translation installation storage area.

7. The method of claim 6, said step of altering said attribute portion as necessary to cause said data to represent said translation further comprising the steps of:

D1)if said translation contains said default attribute, then altering said data stored in said translation installation storage area to represent said translation without altering said attribute portion of said data; and D2) if said translation does not contain said default attribute, then altering said data stored in said translation installation storage area to represent said translation.

8. The method of claim 7, wherein said step of altering said attribute portion of said data stored in said translation installation storage area to represent said default attribute includes the step of:

altering said attribute portion to identify at least one of a page size and a caching protocol.

9. The method of claim 6 further comprising the preliminary step of:

selecting one of a first attribute and a second attribute as said default attribute.

10. In a computer system, a method for installing a translation in a translation lookaside buffer, said method comprising the steps of:

detecting said translation is not installed in said translation lookaside buffer;

preloading an installation storage area with a default attribute;

determining a translated address part and an attribute part of said translation subsequent to said step of preloading;

if said attribute part is said default attribute, then storing said translated address part in said installation storage area without overwriting said default attribute stored in said step of preloading;

if said attribute part is not said default attribute, then storing both said translated address part and said attribute part of said translation in said installation storage area, overwriting said default attribute with said attribute part; and installing said translation in said translation lookaside buffer using said translation stored in said installation storage area.

11. The method of claim 10 further comprising the preliminary step of executing an operating system to select said default attribute.

12. The method of claim 11, wherein said step of preloading includes the step of:

preloading said default attribute to identify at least one of a page size and a caching protocol.

13. The method of claim 10, wherein said step of preloading includes the step of:

preloading said default attribute to identify at least one of a page size and a caching protocol.

14. The method of claim 10, wherein said step of preloading said default attribute includes the step of:

accessing said default attribute from a dynamic default attribute storage area.

15. A processor comprising:

a translation look-aside buffer;

a translation look-aside buffer installation storage area including a virtual address area, a translated address area, and an attribute area;

a translation look-aside buffer default register;

a preload circuit having a first input coupled to receive a signal indicating a translation for a virtual address is not stored in said translation look-aside buffer, said preload circuit coupled to said translation look-aside buffer default register and said attribute area, wherein data preloaded from said translation look-aside buffer default register into said translation look-aside buffer installation storage area is to be overwritten if said data is incorrect prior to installing said translation into said translation look-aside buffer.

16. The processor of claim 15, wherein said translation look-aside buffer default register stores one of a caching protocol and a page size.

17. The processor of claim 15 further comprising:

a current address space identifier register coupled to said preload circuit.

18. A method for storing a translation in an address translation unit, said address translation unit for translating virtual addresses into translated addresses, said method comprising the computer implemented steps of:

detecting said translation is not stored in said address translation unit;

preloading a default attribute for said translation in said address translation unit, wherein said default attribute identifies one of a page size and a caching protocol;

determining said translation using one or more page tables subsequent to said step of preloading said default attribute; and storing in said address translation unit any remaining data necessary to complete said translation.

19. The method of claim 18, wherein said step of storing said translation includes the steps of:

if said translation contains said default attribute, then storing the translation in said address translation unit using the previously stored default attribute; and if said translation does not contain said default attribute, then storing said translation in said address translation unit using the contents of an attribute field in said translation.

20. The method of claim 18 further comprising the step of:

storing a virtual address field of said translation in said address translation unit prior to said step of determining.

* * * * *